J. S. SIMSOHN.
PROCESS OF AUTOMATICALLY REGULATING THE ADDITION OF A TREATING AGENT TO WATER.
APPLICATION FILED OCT. 25, 1918.
1,388,613. Patented Aug. 23, 1921.
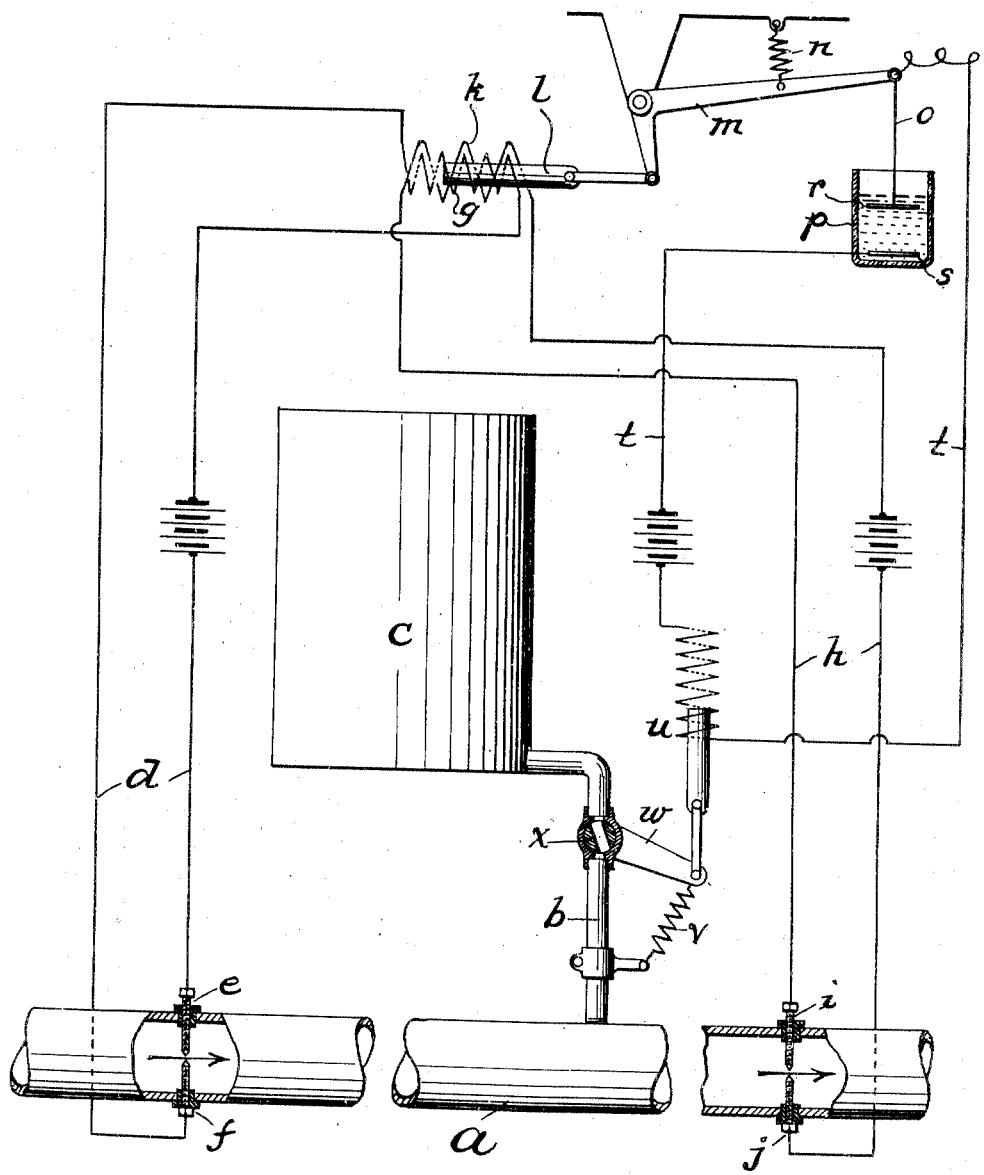
WITNESS:
INVENTOR
Julian S. Simsohn
BY Frank L. Busser
ATTORNEY.

UNITED STATES PATENT OFFICE.

JULIAN S. SIMSOHN, OF PHILADELPHIA, PENNSYLVANIA.

PROCESS OF AUTOMATICALLY REGULATING THE ADDITION OF A TREATING AGENT TO WATER.

1,388,613.   Specification of Letters Patent.   Patented Aug. 23, 1921.

Application filed October 25, 1918. Serial No. 259,695.

*To all whom it may concern:*

Be it known that I, JULIAN S. SIMSOHN, a citizen of the United States, residing at Philadelphia, county of Philadelphia, and State of Pennsylvania, have invented a new and useful Improvement in Processes of Automatically Regulating the Addition of a Treating Agent to Water, of which the following is a full, clear, and exact description, reference being had to the accompanying drawings, which form a part of this specification.

My invention relates to the treatment of water, sewage, etc., to change its quality, as, for example, to effect its softening, purification, or clarification. The object of the invention is to automatically effect the continuous addition of the neutralizing, purifying, or other treating agent in amounts and proportions that will correspond to the theoretical amounts and proportions required, notwithstanding variations in the quality of the water to be treated and in the volume of its flow.

The usual method for regulating the supply of the neutralizing or purifying substance is to carefully analyze the water before or after treatment, determine therefrom the proportion of the neutralizing or purifying agent required, and adjust the degree of concentration and the rate of flow of the latter to correspond to the analysis and rate of flow of the untreated water. So long as both the rate of flow and the quality of the untreated water remain constant, the process effects the desired result.

Unfortunately, both the quality and rate of flow of the water to be treated are factors so variable as to preclude the successful use of any process which involves a fixed rate of addition of the treating agent. In practice, frequent analyses of the water, and frequent observations of its rate of flow, are imperative, in order that, at frequent intervals, the rate of supply of the treating agent may be adjusted accordingly.

An approach toward the solution of the problem has been made by devising means whereby the rate of flow of the treating agent is automatically proportioned to the rate of flow of the water to be treated. The successful operation of the apparatus presupposes that it will be maintained in perfect running order, which experience shows is impracticable. But whatever degree of success it attains in accomplishing a partial solution of the problem, it does not purport to automatically adjust the rate of flow to either variations in quality of the water to be treated or variations in concentration of the treating agent. Hence, it is necessary to make frequent analyses of the water to be treated and frequent corresponding adjustments of the means for regulating the supply of the treating agent. In the intervals between such adjustments, variations, often pronounced, in the quality of the water to be treated, are not provided for, and consequently the system, even when it operates as designed, fails to give satisfactory results.

My invention involves the utilization of the known principle that the electrical conductivity of water varies with its content of soluble salts. Before explaining the mode of application of the principle, it may be helpful to explain a typical water treatment, for example, a treatment for softening hard water. Thus, water containing the soluble salt calcium sulfate may be softened by treatment with sodium carbonate (soda ash), forming the insoluble salt calcium carbonate and the soluble salt sodium sulfate. The reaction is thus expressed:

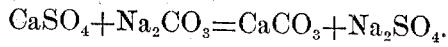

$$CaSO_4 + Na_2CO_3 = CaCO_3 + Na_2SO_4.$$

In this process, it is necessary to add an excess of the softening agent ($Na_2CO_3$). It is clear that if this excess can be maintained constant, ideal conditions for treatment will constantly be maintained.

It is clear, also, that whatever the conductivity of the untreated water may be, the effect of an addition of soda ash in excess is to increase the conductivity of the water by an amount substantially equal to the excess of soda ash; that is, the softened water contains in solution an amount of sodium sulfate substantially equal to the amount of calcium sulfate in solution in the untreated water and in addition contains in solution a certain amount of uncombined soda; the insoluble calcium carbonate formed by the reaction not affecting the conductivity of the water.

If it be assumed that the flowing untreated water contains any given percentage whatever of calcium sulfate, and that means are provided to continuously supply soda ash liquor, it is clear that if a force representing, or varying with, the difference between the conductivity of the untreated water and the conductivity of the treated softened water can be made to regulate the supply of soda ash liquor, regardless of its degree of concentration, to conform to what is ideally required, the problem is solved.

It will be appreciated, for example, that if either the rate of flow, or the percentage of the hardening ingredient per unit of volume, of the untreated water increases, thereby diminishing the proportion of the uncombined treating agent in the treated water, the difference between the conductivities of the untreated water and treated water will decrease and the decreased force representing, or corresponding to, that difference must be made to operate to increase the supply (whatever the concentration at the time may be) of the softening agent. Conversely, if either the rate of flow, or the content of the hardening ingredient, of the untreated water diminishes, the difference between the conductivities of the untreated water and treated water will increase; and the increased force representing, or corresponding to, that difference must be made to decrease the supply of the softening agent.

The apparatus illustrated in the accompanying drawing represents, diagrammatically, one preferred means of carrying out the process, although it will be understood that the execution of the process is not limited to the use of any particular construction of apparatus.

I will describe the apparatus as adapted to the softening of hard water, although it will be understood that this is only one illustrative kind of treatment to which my process is applicable.

A pipe $a$, through which water, containing in solution calcium sulfate (and perhaps other salts) is flowing in the direction of the arrow, is connected, through an inlet pipe $b$ with a tank $c$ containing soda ash liquor of any desired degree of concentration.

An electric circuit $d$ includes two separated, but closely approximating, electrodes $e$ and $f$, both so situated within that part of the pipe $a$ through which the untreated water is passing that the current can be completed only by passing through the water flowing through the gap between the electrodes. One of these electrodes may be made adjustable, although the adjustment, when once properly made, remains fixed. The circuit $d$ also includes one of the coils $g$ of an electro-magnet or solenoid having a core or armature $l$.

Another electric circuit $h$ includes two electrodes $i$ and $j$, similar in their arrangement to electrodes $e$ and $f$, but positioned within the pipe $a$ at a point beyond the inlet from the tank $c$. The circuit $h$ also includes the other coil $k$ of the electro-magnet.

The two coils $g$ and $k$, having the common armature $l$, are so wound that their magnetic attraction for the armature operates in opposite directions. However, at all times (in the water softening process) the power of the coil $k$ exceeds that of the coil $g$ due to the fact that the resistance in circuit $d$ is greater than the resistance in circuit $h$, this being due, as hereinbefore explained, to the fact that the treated water has a higher soluble salt content, and hence greater conductivity, than the untreated water. Hence, the armature $l$ tends constantly to be drawn to the left; but being connected with a lever $m$, restrained by a tension spring $n$, its movement is limited, and the extent of its movement obviously depends upon the difference between the magnetic forces of the two coils $g$ and $k$.

The lever $m$ carries a rod $o$, which in turn carries an electrode $r$ immersed in a tank $p$ containing a fluid capable of conducting electricity. In the tank $p$ is another stationarily positioned electrode $s$. The fluid, for example, may be sulfuric acid, and the two electrodes may be of any conducting material resistant to the action of the acid.

The circuit $t$ in which the electrodes $r$ and $s$ are included includes also an electro-magnet or solenoid $u$, the armature or core of which is connected with a tension spring $v$ and a lever $w$, the spring yieldingly restraining the armature from movement. The lever $w$ is secured to a valve $x$ in the pipe $b$, the valve $x$ regulating the outflow of the soda ash solution from the tank $c$.

If it be supposed that the valve $x$ has been so positioned, by its controlling mechanism, as to allow just the proper flow of soda ash solution required for a given flow of untreated water containing a given percentage of calcium sulfate, and if it be further supposed that the percentage of calcium sulfate in the water to be treated increases, the necessary effects, assuming the position of the valve $x$ to remain unchanged, would be to increase the conductivity of the untreated water and to reduce the excess of the soda ash solution and consequently decrease the difference between the conductivities of the untreated water and the treated water. It is clear that, under these conditions, the difference in the power of the two coils $g$ and $k$ will increase, thereby moving the core $l$ to the right, and causing the electrodes $r$ and $s$ to recede, thereby increasing the resistance in the circuit $t$, decreasing the power of the magnet $u$ and moving the valve $x$ into position to allow more soda ash solution to flow from the tank $c$ into the pipe $a$.

It will be understood that, normally, the electrical apparatus is immediately responsive to variations in the quality of the water to be treated and also that, normally, any change in the quality of the water will be a very gradual one. Therefore, there will normally be no sudden change conforming to the above described operation, the operation of the valve being normally so slow as to be imperceptible. Hence, it is substantially accurate to say that at all times the valve will be properly positioned to supply the exact proportion (including the desired excess) of soda ash solution required to neutralize the calcium carbonate in solution in the water to be treated.

It will also be clear, upon reflection, that in the event of any variation in the concentration of soda ash in the tank $c$, arising from its necessary replenishment from time to time, the apparatus will operate to vary accordingly the rate of flow of the solution from the tank. Thus, if it be assumed that the water to be treated is of invariable quality, but that the degree of concentration of the soda ash solution increases, the proportion of salts in the treated water would tend to increase, thereby increasing its conductivity and increasing the difference between the conductivities of the treated and and untreated water. The result will be to increase the magnetic force operative upon the armature $l$, interpose less resistance in the circuit $t$, and throttle the valve $x$, thus causing a reduced rate of flow from the tank $c$.

If it be assumed that with no variation in the quality of the untreated water, its rate of flow increases, it is clear that the soluble salt content of the treated water will tend to correspondingly decrease. The effect will necessarily be to diminish the conductivity of the treated water, decrease the difference between the respective conductivities of the untreated water and treated water, and effect a corresponding opening of the valve $x$, thereby allowing an increased flow from the tank $c$.

It will thus be understood that whether, during any given time, the variable factor be either the rate of flow of the untreated water, the quality of the untreated water, or the degree of concentration of the treating agent, an adjustment of the rate at which the treating agent is supplied must be made; and that, in my invention, this adjustment will always be automatically effected. So long as these factors remain constant the resistance in circuit $t$ remains constant, and so long as this resistance remains constant the valve $x$ remains fixed in its automatically adjusted position; but with a variable resistance in circuit $t$ the valve $x$ operates steadily in all positions from wide open to shut.

It will also be clear that, under some conditions, regulation of the feed of the treating agent could be effected solely in accordance with variations in the conductivity of the treated water, instead of in accordance with variations in the difference between the conductivities of the untreated and treated water. Thus, if the untreated water contains no salt except that with which the treating agent is adapted to react, the apparatus hereinbefore described will operate to properly regulate the flow of the treating agent if the electric circuit $h$ is omitted.

By claiming the changing of the quality of the water, I mean to include any change whatever in its chemical composition that would render water unsuitable for a particular desired use suitable for such use. For example, I mean to include the conversion of water too hard for boiler purposes to water which is softened to the extent desired to render it entirely suitable and desirable for boiler purposes; or the conversion of water which contains certain impurities which it is desired to remove before filtration into a condition in which such impurities will be capable of being sedimentized; or to change water that is high in bacterial content to water which is potable.

Having now fully described my invention, what I claim and desire to protect by Letters Patent is:

1. In the treatment of water, etc., to change its quality, the process of automatically proportioning the addition of a treating agent in accordance with the quality and rate of flow of the water to be treated, which consists in continuously supplying the treating agent during the flow of water and varying the rate of supply of the treating agent in accordance with variations in the electrical conductivity of the water.

2. In the treatment of water, etc., to change its quality, the process of automatically proportioning the addition of a treating agent in accordance with the quality and rate of flow of the water to be treated, which consists in continuously supplying the treating agent during the flow of water, passing an electrical current through the treated water, whereby the resistance in the circuit varies in accordance with variations in the soluble salt content of the treated water, and utilizing the power of said electric current to affect the rate of supply of the treating agent.

3. In the treatment of water, etc., to change its quality, the process of automatically proportioning the addition of a treating agent in accordance with the quality and rate of flow of the water to be treated, which consists in continuously supplying the treating agent during the flow of water, passing an electrical current through the untreated water, whereby the resistance in the circuit varies in accordance with variations in the soluble salt content of the untreated water, and utilizing the power of said electric current to affect the rate of supply of the treating agent.

4. In the treatment of water, etc., to change its quality, the process of automatically proportioning the addition of a treating agent in accordance with the quality and rate of flow of the water to be treated, which consists in continuously supplying the treating agent during the flow of water and varying the rate of supply of the treating agent in accordance with variations in the electrical conductivities of the untreated water and treated water.

5. In the treatment of water, etc., to change its quality, the process of automatically proportioning the addition of a treating agent in accordance with the quality and rate of flow of the water to be treated, which consists in continuously supplying the treating agent during the flow of water and varying the rate of supply of the treating agent in accordance with variations in the difference between the respective conductivities of the untreated water and the treated water.

6. In the treatment of water, etc., to change its quality, the process of automatically proportioning the addition of a treating agent in accordance with the quality and rate of flow of the water to be treated, which consists in passing electrical currents through the untreated water and treated water respectively, producing magnetic fields in the respective currents, and causing said magnetic fields and an external force to coöperate to regulate the rate of supply of the treating agent in accordance with variations in the electrical conductivities of the untreated water and treated water.

7. In the treatment of water, etc., to change its quality, the process of automatically proportioning the addition of a treating agent in accordance with the quality and rate of flow of the water to be treated, which consists in passing electrical currents through the untreated water and treated water respectively, producing magnetic fields in the respective currents, causing said magnetic fields to exert a mechanical pull in opposite directions, utilizing an external force to yieldingly oppose the mechanical pull in one direction, and regulating the supply of the treating agent in accordance with the resultant variations in said mechanical pull.

In testimony of which invention, I have hereunto set my hand, at Philadelphia, Pa., on this 22nd day of October, 1918.

JULIAN S. SIMSOHN.